Patented July 14, 1931

1,814,360

UNITED STATES PATENT OFFICE

JOHN K. BERRESFORD, OF NIAGARA FALLS, NEW YORK, ASSIGNOR, BY MESNE ASSIGNMENTS, TO FRANK S. LOW, OF NIAGARA FALLS, NEW YORK, AND A. W. BERRESFORD, OF DETROIT, MICHIGAN

PRODUCTION OF FERRIC AND CHROMIC CHLORIDES

No Drawing.   Application filed January 7, 1929.   Serial No. 330,975.

This invention relates to improvements in the production of chromic chloride and ferric chloride, and comprises a process in which a fused bath of ferrous and chromous chlorides is subjected to chlorination preferably at temperatures, around 800 to 900° C. or higher, the ferric chloride formed in said chlorination being vaporized and the chromic chloride formed remaining unvaporized, all as more fully hereinafter set forth and as claimed.

In the present process, I use a fused bath of a mixture of ferrous and chromous chloride, which may contain a small amount of chromic chloride and/or ferric chloride. The ferrous and chromous chlorides mixture may be produced in any suitable manner but can advantageously be produced by the chlorination of ferrochrome under suitable conditions.

In carrying out the invention, the present ferrous and chromous chlorides are heated to form a fused bath, or, if produced in the form of a fused bath, are maintained in that form, and are subjected to chlorination with chlorine at a sufficiently high temperature to maintain the bath in a fused condition. The reaction is exothermic and if chlorine is rapidly supplied and brought into intimate contact with the ferrous and chromous chlorides, the bath of temperature will rise from the reaction. It is important that reducing agents such as ferrochrome, be absent from the fused bath in order to permit the chlorination of the ferrous and chromous chlorides to the corresponding ferric and chromic chlorides. An excess of chlorine is employed in the process.

The ferric chloride formed is removed from the fused bath in the form of vapors and some chromic chloride may be removed with it, but the chromic chloride for the most part will remain behind. This removal of ferric chloride will take place during the chlorination when a current of chlorine is passed in contact with the fused bath, e. g. at a temperature of about 800 to 900° C., but the furnace can be further heated after the chlorination is substantially completed to complete the removal of the ferric chloride, leaving only chromic chloride, substantially free from ferric chloride, behind. The chromic chloride should be protected from the air until it has cooled to a low temperature, e. g. below 250° C. to prevent its oxidation or burning.

The process can be carried out in furnaces of different types and either as a batch operation or as a continuous operation. In all cases, provision should be made for bringing the chlorine into intimate contact with the fused chlorides to effect their further chlorination, and for protecting the chromic chloride from the air until it has cooled to a low temperature.

I claim:

1. The method of separately producing chromic chloride and ferric chloride which comprises subjecting a fused bath of ferrous and chromous chlorides to chlorination while maintaining the bath in a fused state, and thereby forming and violatilizing ferric chloride while leaving chromic chloride behind.

2. The method of producing chromic chloride and ferric chloride which comprises subjecting a fused bath of ferrous and chromous chlorides to chlorination.

3. The process according to the preceding claim in which after the chlorination of chromic and the ferric chlorides formed are heated and the ferric chloride is vaporized with substantial completeness, leaving a chromium chloride substantially free therefrom.

4. The method of producing chromic chloride and ferric chloride which comprises subjecting a fused bath of ferrous and chromous chlorides to chlorination at a temperature in excess of about 800° C.

5. The method of producing chromic chloride and ferric chloride which comprises subjecting a fused bath of ferrous and chromous chlorides to chlorination at a temperature around 800 to 900° C.

In testimony whereof I affix my signature.

JOHN K. BERRESFORD.

CERTIFICATE OF CORRECTION.

Patent No. 1,814,360.                                        Granted July 14, 1931, to

JOHN K. BERRESFORD.

It is hereby certified that error appears in the printed specification of the above numbered patent requiring correction as follows: Page 1, line 21, for "invention, the present" read present invention, the; line 30, before "ferrous" insert bath of, and line 31, strike out "bath of"; line 81, claim 3, for "of" read the; and that the said Letters Patent should be read with these corrections therein that the same may conform to the record of the case in the Patent Office.

Signed and sealed this 22nd day of September, A. D. 1931.

(Seal)                                                                               M. J. Moore,
Acting Commissioner of Patents.